US010640065B2

(12) United States Patent
Cho et al.

(10) Patent No.: US 10,640,065 B2
(45) Date of Patent: May 5, 2020

(54) LOWER STIFFENER FOR BUMPER OF VEHICLE

(71) Applicants: Hyundai Motor Company, Seoul (KR); Kia Motors Corporation, Seoul (KR); Lotte Chemical Corporation, Seoul (KR); EELCEE LTD., Gunpo-si (KR)

(72) Inventors: Jeong Min Cho, Suwon-si (KR); Tae Hyung Kim, Incheon (KR); Chi Hoon Choi, Suwon-si (KR); Hyun Gyung Kim, Hwaseong-si (KR); Han Jo Jeong, Uiwang-si (KR); Jong Wook Lee, Daejeon (KR); Jan-Anders Mansson, West Lafayette, IN (US); Queein Chang Mansson, Seoul (KR); Yeun Hee Hwang, Daejeon (KR)

(73) Assignees: Hyundai Motor Company, Seoul (KR); Kia Motors Corporation, Seoul (KR); Lotte Chemical Corporation, Seoul (KR); EELCEE LTD., Gunpo-si (KR)

( * ) Notice: Subject to any disclaimer, the term of this patent is extended or adjusted under 35 U.S.C. 154(b) by 127 days.

(21) Appl. No.: 16/057,505

(22) Filed: Aug. 7, 2018

(65) Prior Publication Data
US 2019/0135209 A1    May 9, 2019

(30) Foreign Application Priority Data

Nov. 7, 2017    (KR) .......................... 10-2017-0147073

(51) Int. Cl.
*B60R 19/18* (2006.01)
*B60R 19/03* (2006.01)
*B60R 19/12* (2006.01)

(52) U.S. Cl.
CPC .............. *B60R 19/18* (2013.01); *B60R 19/03* (2013.01); *B60R 19/12* (2013.01); *B60R 2019/1893* (2013.01)

(58) Field of Classification Search
CPC .......... B60R 19/18; B60R 19/03; B60R 19/12
(Continued)

(56) References Cited

U.S. PATENT DOCUMENTS 2,157,147 A * 5/1939 Roth ....................... B60R 21/34
293/36
3,831,990 A * 8/1974 Singh ...................... B60R 13/04
293/1

(Continued)

FOREIGN PATENT DOCUMENTS

JP    2002052993 A    2/2002
KR    101198600 B1    11/2012
(Continued)

*Primary Examiner* — Jason S Morrow
(74) *Attorney, Agent, or Firm* — Slater Matsil, LLP

(57) ABSTRACT

A lower stiffener is provided for a bumper of a vehicle. The lower stiffener is mounted on a lower portion of a bumper beam or a front end module (FEM) carrier of the vehicle. The lower stiffener includes a pair of core portions formed by extending in a width direction of the vehicle in an elongated loop shape corresponding to a shape of the bumper of the vehicle, and arranged parallel to each other at a regular interval. A pair of molding portions surrounds the core portions, respectively and a connection portion connects and integrates the pair of molding portions with each other.

19 Claims, 5 Drawing Sheets

(58) Field of Classification Search
USPC .................................................. 293/120, 133
See application file for complete search history.

(56) References Cited

U.S. PATENT DOCUMENTS

| | | | |
|---|---|---|---|
| 6,394,512 B1* | 5/2002 | Schuster ................. | B60R 19/12 293/118 |
| 6,726,260 B1* | 4/2004 | Wang ..................... | B60R 19/12 293/117 |
| 9,079,549 B2 | 7/2015 | Krammer et al. | |
| 2006/0061111 A1* | 3/2006 | Ignafol .................. | B60R 19/18 293/102 |
| 2011/0175379 A1 | 7/2011 | Erzgräber et al. | |
| 2012/0306222 A1 | 12/2012 | Choi et al. | |
| 2013/0147217 A1* | 6/2013 | Kim ....................... | B60R 19/12 293/148 |
| 2015/0015005 A1* | 1/2015 | Shin ....................... | B60R 19/18 293/120 |
| 2016/0272138 A1* | 9/2016 | Judd ...................... | B60R 19/44 |
| 2017/0028951 A1* | 2/2017 | Shin ...................... | B60R 19/023 |
| 2017/0106822 A1* | 4/2017 | Steinebach ............ | B60R 19/03 |
| 2017/0274850 A1* | 9/2017 | Aizawa .................. | B60R 19/18 |
| 2018/0037179 A1* | 2/2018 | Steinebach ............ | B22D 25/02 |
| 2018/0222416 A1* | 8/2018 | Jadhav ................... | B60R 19/18 |

FOREIGN PATENT DOCUMENTS

| | | |
|---|---|---|
| KR | 101198621 B1 | 11/2012 |
| KR | 20150079267 A | 7/2015 |
| KR | 20150116934 A | 10/2015 |
| KR | 20160080161 A | 7/2016 |
| KR | 20160090154 A | 7/2016 |

* cited by examiner

LOWER STIFFENER FOR BUMPER OF VEHICLE

CROSS-REFERENCE TO RELATED APPLICATIONS

This application claims priority to Korean Patent Application No. 10-2017-0147073, filed on Nov. 7, 2017, which application is hereby incorporated herein by reference.

TECHNICAL FIELD

The present invention relates generally to a lower stiffener for a bumper of a vehicle.

BACKGROUND

In general, a bumper beam for a vehicle is configured to be elastically deformed to minimize physical damage to the vehicle upon a low-speed collision thereof. The bumper beam is a buffering means provided at the front and rear of a vehicle so that when a vehicle collides with other vehicles or fixtures, the bumper beam absorbs impact, thereby securing safety of passengers and minimizing deformation of a vehicle body at the same time.

Meanwhile, in order to satisfy pedestrian safety regulations for minimizing injury when a vehicle collides with a pedestrian, a lower stiffener is provided on a lower portion of the bumper beam or a front end module (FEM) carrier.

In the case of the above-mentioned bumper beam and lower stiffener, when strength is increased, weight and costs are rapidly increased, whereas when weight and costs are decreased, strength is decreased and thus a function thereof may be insufficiently performed.

Thus, a fiber-reinforced thermoplastic resin having increased strength while using weight reducing material, such as a glass fiber mat thermoplastic (GMT) material and a continuous fiber reinforced thermoplastic composite tape (CFT) material have been developed.

Herein, the GMT material is a composite material consisting of a polypropylene resin which is a general-purpose resin, and a glass fiber mat reinforcement, and strength of glass fibers itself is reinforced by a mat shape. Further, the CFT material is a composite material consisting of a polypropylene resin which is a general-purpose resin, and continuous fibers, wherein a polymer resin such as PP covers and protects the continuous fibers such that strength of the continuous fibers itself is maintained, whereby the polymer resin is reinforced with the continuous fibers.

The GMT material and the CFT material are novel materials exhibiting superior strength to any existing materials, and have characteristics such as light weight and a degree of freedom in design, which are unique properties of plastic, as well as high productivity, recyclability, and the like, due to the thermoplastic resin.

In recent years, the above-mentioned GMT material and CFT material are being used in various parts of a vehicle because they are lightweight, have excellent collision energy absorption capability, have a high degree of freedom in design, and have excellent assemblability, corrosion resistance, stiffness, stability, sound insulation, vibration damping, elasticity, impact resistance, and the like.

However, since the lower stiffener according to the related art is merely disclosed as a part for satisfying the pedestrian safety regulations rather than an optimal design, it causes weight to be increased when it included in a bumper, and it merely reduces knee bending angle when a vehicle collides with a pedestrian. Accordingly, a structural dynamic approach is not achieved in terms of stiffness and flexibility, leading to an increase in cost and weight.

The foregoing is intended merely to aid in the understanding of the background of the present invention, and is not intended to mean that the present invention falls within the purview of the related art that is already known to those skilled in the art.

SUMMARY

The present invention relates generally to a lower stiffener for a bumper of a vehicle and, in particular embodiments, to a lower stiffener for a bumper of a vehicle, the lower stiffener being capable of achieving weight reduction while maintaining stiffness and strength. For example, the lower stiffener can be capable of achieving weight reduction while maintaining stiffness and strength at a desired level by improving a material and a shape of the stiffener.

Embodiments of the present invention can address the above problems occurring in the related art, and the present invention provides a lower stiffener for a bumper of a vehicle.

According to one aspect of the present invention, there is provided a lower stiffener for a bumper of a vehicle. The lower stiffener is mounted on a lower portion of a bumper beam or a front end module (FEM) carrier of the vehicle. The lower stiffener includes a pair of core portions formed by extending in a width direction of the vehicle in an elongated loop shape corresponding to a shape of the bumper of the vehicle, and arranged parallel to each other at a regular interval, A pair of molding portions surround the core portions, respectively and a connection portion connects and integrates the pair of molding portions with each other.

The core portions may have a circular shape in cross section, and may have a diameter of 5 to 10 mm, the core portions being configured to satisfy an equation below:

$$3.3 \leq \text{(center distance between core portions)}/\text{(diameter of core portions)} \leq 8 \quad \text{Equation 1}$$

A value of (center distance between core portions)/(diameter of core portions) described in the Equation 1 is 4 to 5.

A thickness of the molding portions may be 1.5 to 4.0 mm, and a thickness of the connection portion may be 2 to 5 mm.

A volume of the core portions may be 25 to 60 vol % with respect to a sum of volumes of the core portions and the molding portions.

With respect to the width direction of the vehicle, the lower stiffener may be divided into a first section defined at a center portion of the lower stiffener, a pair of second sections defined from opposite ends of the first section to mounting portions connected to the bumper beam or the FEM carrier, and a pair of third sections defined from ends of the second sections to ends of the lower stiffener. The molding portions in the first section are configured such that thickness in a front and rear direction of the vehicle is greater than thickness in a height direction of the vehicle.

The molding portions in the first section may be configured such that cross-sectional area gradually increases toward a center with respect to the width direction of the vehicle.

The molding portions in the first section may be configured such that thickness in the front and rear direction gradually increases toward the center with respect to the width direction of the vehicle.

The connection portion may be configured such that thickness in the height direction in the first section is greater than thickness in the height direction in the second and third sections.

The connection portion in the first section may be provided with a center rib formed in the front and rear direction. The connection portion at boundaries of the first and second sections may be provided with a pair of vertical ribs. The connection portion in the first and second sections may be provided with X-shaped cross ribs formed at centers of the center rib and the pair of vertical ribs. The connection portion in the second sections may be provided with horizontal ribs formed by extending from ends of the cross ribs to the mounting portions in the width direction.

The core portions may consist of 40 to 60 wt % of a continuous fiber and 40 to 60 wt % of a thermoplastic resin.

The molding portions may consist of 20 to 40 wt % of a non-continuous fiber and 60 to 80 wt % of a thermoplastic resin.

According to the embodiment of the present invention, the lower stiffener is manufactured using fiber-reinforced plastic, whereby weight reduction thereof is possible to be achieved.

Further, fiber-reinforced plastic made of a thermoplastic matrix reinforced with continuous fibers is used to form the pair of core portions maintaining the overall shape of the stiffener, to form the molding portions surrounding and connecting the core portions, and to form the connection portion. Thus, stiffness and strength of the lower stiffener can be maintained at a desired level.

In addition, the thickness of the molding portions and the connection portion is varied in each section, whereby it is possible to improve stiffness and the strength of the lower stiffener and to expect achievement in weight reduction.

BRIEF DESCRIPTION OF THE DRAWINGS

The above and other features and other advantages of the present invention will be more clearly understood from the following detailed description when taken in conjunction with the accompanying drawings, in which.

DETAILED DESCRIPTION OF ILLUSTRATIVE EMBODIMENTS

Figure 1:
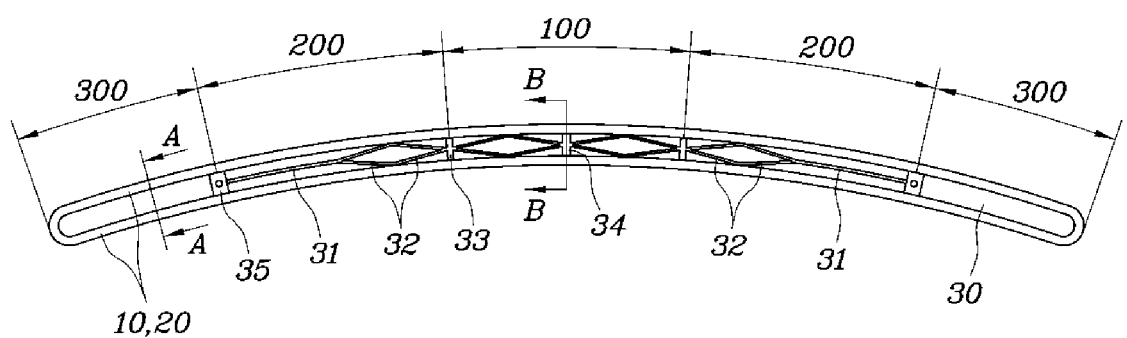
FIG. 1 is a view showing a lower stiffener for a bumper of a vehicle according to an embodiment of the present invention.

Hereinbelow, exemplary embodiments of the present invention will be described in detail with reference to the accompanying drawings. Embodiments of the present invention are presented to make complete disclosure of the present invention and help those who are ordinarily skilled in the art best understand the invention. Various changes to the following embodiments are possible and the scope of the present invention is not limited to the following embodiments. Throughout the drawings, the same reference numerals will refer to the same or like parts.

Figure 2:
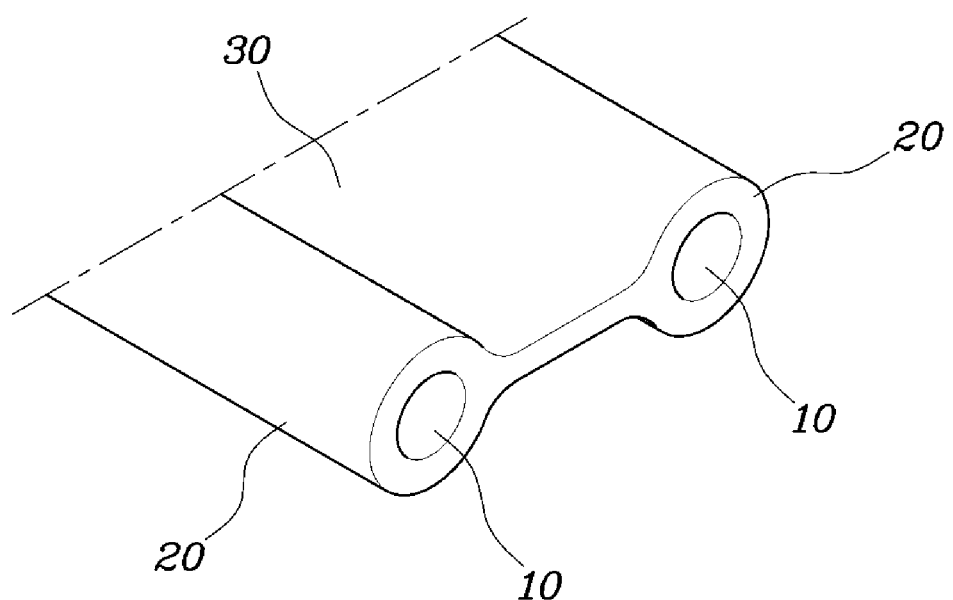
FIG. 2 is an exploded perspective view and a cross-sectional view showing a cross section taken along line A-A of FIG. 1.
Figure 2:
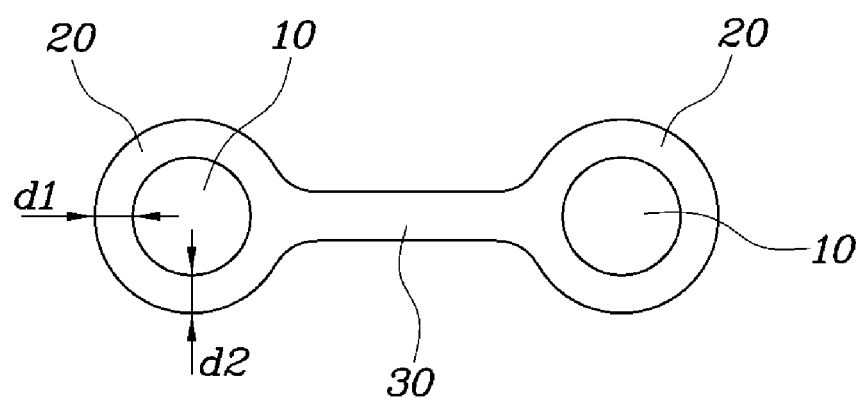
Figure 3:
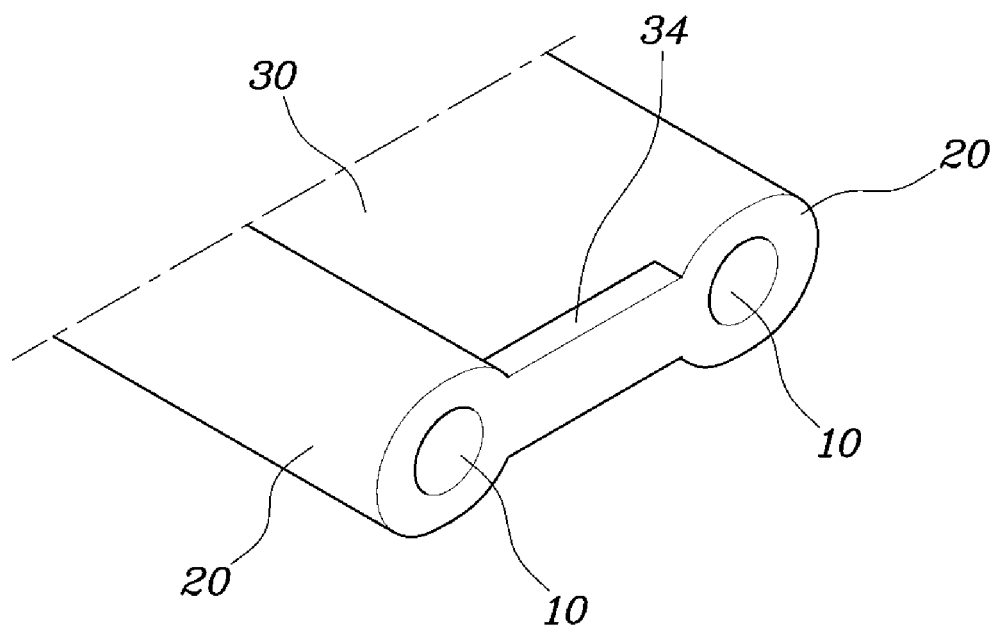
FIG. 3 is an exploded perspective view and a cross-sectional view showing a cross section taken along line B-B of FIG. 1.
Figure 3:
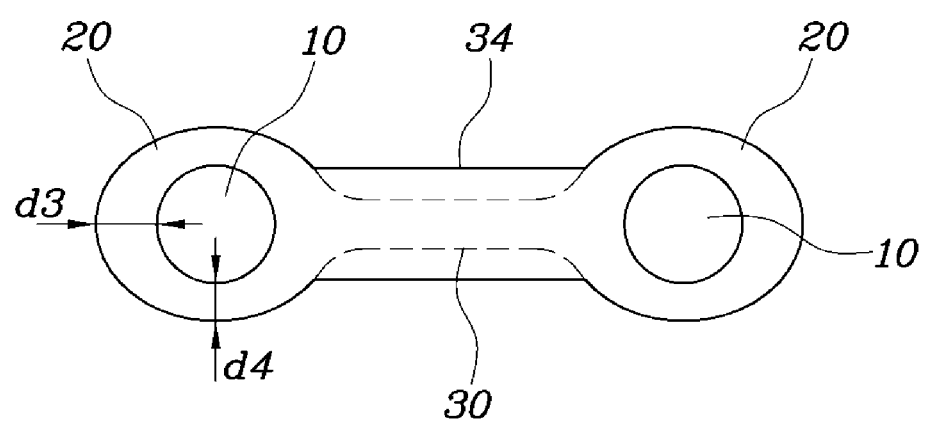

FIG. 1 is a view showing a lower stiffener for a bumper of a vehicle according to an embodiment of the present invention, FIG. 2 is an exploded perspective view and a cross-sectional view showing a cross section taken along line A-A of FIG. 1, and FIG. 3 is an exploded perspective view and a cross-sectional view showing a cross section taken along line B-B of FIG. 1.

In FIG. 1, the upper direction is the front direction, the lower direction is the rear direction, and the lateral direction is the width direction with respect to a vehicle.

As shown in the drawings, a lower stiffener for a bumper of a vehicle according to an embodiment of the present invention. A pair of core portions 10 is formed by extending in the width direction of the vehicle in an elongated loop shape corresponding to a shape of the bumper, and arranged parallel to each other at a regular interval. A pair of molding portions 20 surrounds the core portions 10, respectively. A connection portion 30 connects and integrates the pair of molding portions 20 with each other. Thus, a shape of the lower stiffener in cross section may maintain a substantially dumbbell shape.

Herein, the core portions 10, the molding portions 20, and the connection portion 30 are made of fiber-reinforced plastic in order to achieve weight reduction while maintaining stiffness and strength of the lower stiffener at a desired level.

The core portions 10 are a unit serving as a reinforcing member to maintain stiffness and strength of the lower stiffener, and are realized in the form of a bar having a loop shape having a substantially circular-shaped cross section and having a predetermined curvature in the front direction. Of course, the core portions 10 may be formed to have a circular shape in cross section, and may be formed to have an irregular closed shape in cross section maintaining a substantially circular shape for efficient molding.

The molding portions 20 are a unit serving as a reinforcing member by supporting the core portions 10 that serves to maintain stiffness and strength of the lower stiffener, and are realized in a shape surrounding and covering the core portions 10. Thus, the molding portions 20 having the core portions 10 therein are also realized in the form of a pipe having a loop shape having a substantially circular-shaped cross section and having a predetermined curvature in the front direction like the core portions 10.

The connection portion 30 is a unit connecting the core portions 10 and connecting the molding portions 20, wherein the connection portion 30 extends such that the facing inside edges of the molding portions 20 are connected to each other. Herein, the connection portion 30 is formed to have a substantially rectangular shape in cross section. Accordingly, the lower stiffener is realized to have a substantially dumbbell shape in cross section.

The lower stiffener according to the present embodiment is configured to vary the thickness of the molding portions 20 and the connection portion 30 in each section based on the width direction of a vehicle, thereby improving stiffness and strength.

For example, as shown in FIG. 1, with respect to the width direction of a vehicle, the lower stiffener is divided into: a first section 100 defined at a center portion of the lower stiffener; a pair of second sections 200 defined from opposite ends of the first section 100 to mounting portions 35 connected to a bumper beam; and a pair of third sections 300 defined from ends of the second sections 200 to ends of the lower stiffener.

First, the core portions 10 may have a cross-sectional diameter of 5 to 10 mm.

Herein, the relationship between the center distance between the core portions 10 and the diameter of the core portions may satisfy the following Equation 1 to achieve weight reduction while satisfying the required performance for stiffness and strength of the lower stiffener in consideration of the cross-sectional diameter of the core portions 10.

$$3.3 \leq \text{(center distance between core portions)}/\text{(diameter of core portions)} \leq 8 \quad \text{Equation 1}$$

In order to satisfy the required performance for stiffness and strength of the lower stiffener as shown in Equation 1, the ratio of the center distance between the core portions to the diameter of the core portions may be equal to or greater than 3.3. In order to achieve reduced weight than plastic stiffeners of comparable performance, the ratio of the center distance between the core portions to the diameter of the core portions may be equal to or less than 8. Preferably, the ratio of the center distance between the core portions to the diameter of the core portions is 4 to 5, more preferably the center distance between the core portions to the diameter of the core portions is 4.3.

Meanwhile, the core portions 10, which are designed to have a substantially circular shape in cross section, have an irregular closed end shape in cross section during actual molding. In consideration of such manufacturing scattering, the molding portions 20 may be formed to have a thickness of 1.5 to 4.0 mm.

In the case that the thickness of the molding portions 20 is equal to or less than 1.5 mm, a phenomenon where the flow of a resin is disturbed during an injection molding process occurs, and thus the performance of the molding portions 20 is significantly reduced. In addition, when the thickness of the molding portions 20 is increased, the area occupied by the core portions 10 in the molding portions 20 is reduced, so that the mechanical stiffness is lowered. Moreover, in order to suppress shrinkage and an increase in occurrence of porosity defects of a resin, the thickness of the molding portions 20 may be limited equal to or less than 4.0 mm.

Meanwhile, the thickness of the core portions 10 is determined within a given range according to the performance of stiffness and strength and the goal of weight reduction. The volume of the core portions 10 may be 25 to 60 vol % with respect to the sum of the volumes of the core portions 10 and the molding portions 20.

In the case that the volume of the core portions 10 is less than 25 vol %, a reinforcing effect in stiffness and strength to the core portions 10 is low and it is difficult to satisfy the required mechanical performance. In the case that the volume of the core portions 10 exceeds 60 vol %, the molding portions 20 are decreased in thickness, leading to a high possibility of causing a defective appearance, and weight is increased. In the present embodiment, the volume of the core portions 10 applied to the first section 100 is an average of 30 vol % with respect to the sum of the volumes of the core portions 10 and the molding portions 20, and the volume of the core portions 10 applied to the second sections 200 and the third sections 300 is an average of 34 vol % with respect to the sum of the volumes of the core portions 10 and the molding portions 20.

The thickness of the connection portion 30 may be 2 to 5 mm.

In the case that the thickness of the connection portion 30 is less than 2.0 mm, reinforcing fibers may not uniformly distributed in a resin during an injection molding process, and a reinforcing effect is significantly deteriorated due to breakage of the reinforcing fibers and flow disturbance of the resin. In addition, it is difficult to satisfy the required mechanical performance. In the case that the thickness of the connection portion 30 exceeds 5 mm, the porosity and the thermal deformation amount of a product are increased, so that general processing defects occurring upon molding of a thick material are exhibited, and it is difficult to obtain a weight reduction effect. In this embodiment, the thickness of the connection portion 30 is 3.0 mm.

Meanwhile, in order to improve stiffness and strength against bending load, the thickness of the molding portions 20 and the connection portion 30 is configured such that thickness in the first section 100 is greater than thickness in the second and third sections 200 and 300.

Specifically, as shown in FIG. 2, the molding portions 20 in the third sections 300 are configured such that thickness d1 in the front and rear direction of the vehicle is equal to thickness d2 in the height direction of the vehicle. Thus, the overall thickness of the molding portions 20 is uniform, whereby the molding portions 20 are realized to have a substantially circular shape in cross section.

Meanwhile, the molding portions 20 in the second sections 200 are configured such that thickness in the front and rear direction is equal to thickness in the height direction like the molding portions 20 of the third sections 300.

On the other hand, as shown in FIG. 3, the molding portions 20 in the first section 100 are configured such that thickness d3 in the front and rear direction is greater than thickness d4 in the height direction. Accordingly, the molding portions 20 are realized to have a substantially oval shape in cross section.

In particular, the molding portions 20 in the first section 100 are configured such that cross-sectional area gradually increases toward a center with respect to the width direction of a vehicle, and thickness in the front and rear direction may gradually increase with respect to the width direction of the vehicle. Thus, stiffness and strength of the lower stiffener can be improved. In particular, a reaction force against bending load can be secured.

Further, the connection portion 30 is configured such that thickness in the height direction in the first section 100 is greater than thickness in the height direction in the second and third sections 200 and 300, whereby stiffness and strength of the lower stiffener can be improved.

Meanwhile, in the present embodiment, various ribs are formed at the connection portion 30 whereby stiffness and strength of the lower stiffener can be improved.

For example, with respect to the width direction of a vehicle, the connection portion 30 in the first section 100 is provided with a center rib 34 formed in the front and rear direction, and the connection portion 30 at the boundaries of the first section 100 and the second sections 200 is provided with a pair of vertical ribs 33 formed in the front and rear direction. Herein, the center rib 34 and the vertical ribs 33 are formed in a shape connecting the pair of molding portions 20 to each other.

Further, the connection portion 30 in the first and second sections 100 and 200 is provided with X-shaped cross ribs 32 formed at centers of the center rib 34 and the pair of vertical ribs 33. In addition, ends of the cross ribs 32, which are connected to the horizontal ribs 31 that will be described later, are formed in a left angle bracket shape (<) and a right angle bracket (>) shape, respectively.

Further, the connection portion 30 in the second sections 200 is provided with horizontal ribs 31 formed by extending from the ends of the cross ribs 32 to the mounting portions 35 in the width direction.

By provision of the center rib 34, the vertical ribs 33, the horizontal ribs 31, and the cross ribs 32 as described above, it is possible to achieve improved resistance to deformation of the lower stiffener.

Meanwhile, the core portions 10, the molding portions 20, and the connection portion 30 according to the present embodiment are made of fiber-reinforced plastic for the purpose of weight reduction. However, in order for the core portions 10 to serve as a reinforcing material, fiber-reinforced plastic forming the molding portions 20 and fiber-reinforced plastic forming the connection portion 30 are configured to differ from each other in composition.

For example, the core portions 10 may consist of 40 to 60 wt % of a continuous fiber and 40 to 60 wt % of a thermoplastic resin. Herein, the continuous fiber may include a glass fiber, a natural fiber, a carbon fiber, an aramid fiber, an ultrahigh molecular weight polyethylene (UHMWPE) fiber, etc., and the thermoplastic resin may include polypropylene (PP), polyamide (PA), polybutylene terephthalate (PBT), polyethylene terephthalate (PET), etc. In the present embodiment, a glass fiber and PP were used.

In the case that the amount of the continuous fiber in the core portions 10 is less than 40 wt %, stiffness and strength of the core portions 10 may not achieve the desired performance, and in the case that the amount of the continuous fiber exceeds 60 wt %, moldability may be deteriorated.

Further, the molding portions 20 and the connection portion 30 may consist of 20 to 40 wt % of a non-continuous fiber and 60 to 80 wt % of a thermoplastic resin. Herein, the non-continuous fiber may include a long glass fiber (LGF), and the thermoplastic resin may include polypropylene (PP), polyamide (PA), polybutylene terephthalate (PBT), polyethylene terephthalate (PET), etc. In the present embodiment, LGF and PP were used.

In the case that the amount of the non-continuous fiber is less than 20 wt %, it is advantageous in weight reduction but lacks in mechanical performance. In the case that the amount of the non-continuous fiber exceeds 40 wt %, brittleness increases and weight increases.

Meanwhile, the reason why the structure of the lower stiffener according to the present invention is adopted will be described in comparison with comparative examples.

Figure 4A:
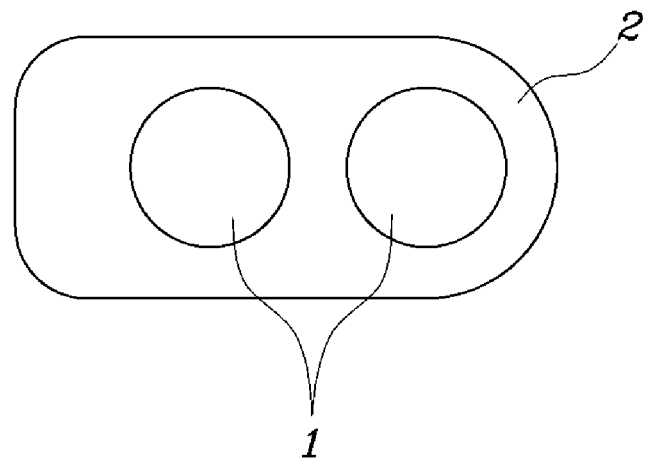
FIGS. 4a to 4c are views showing a lower stiffener according to comparative examples and an example.
Figure 4B:
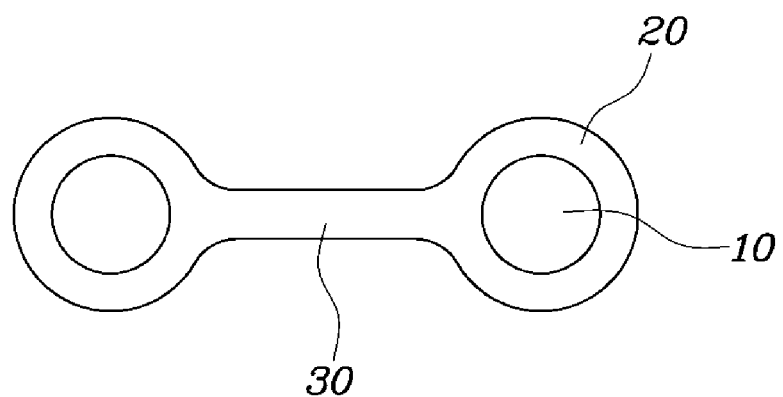
Figure 4C:
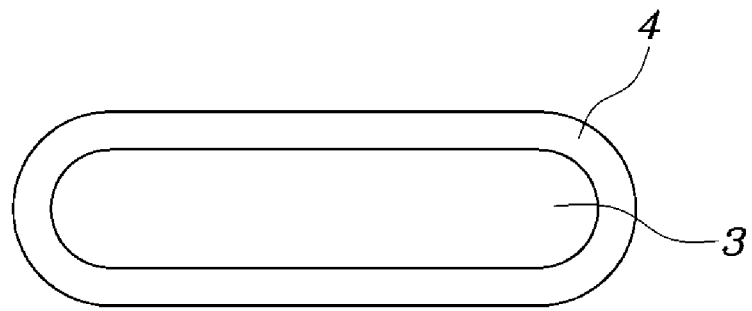
Figure 5:
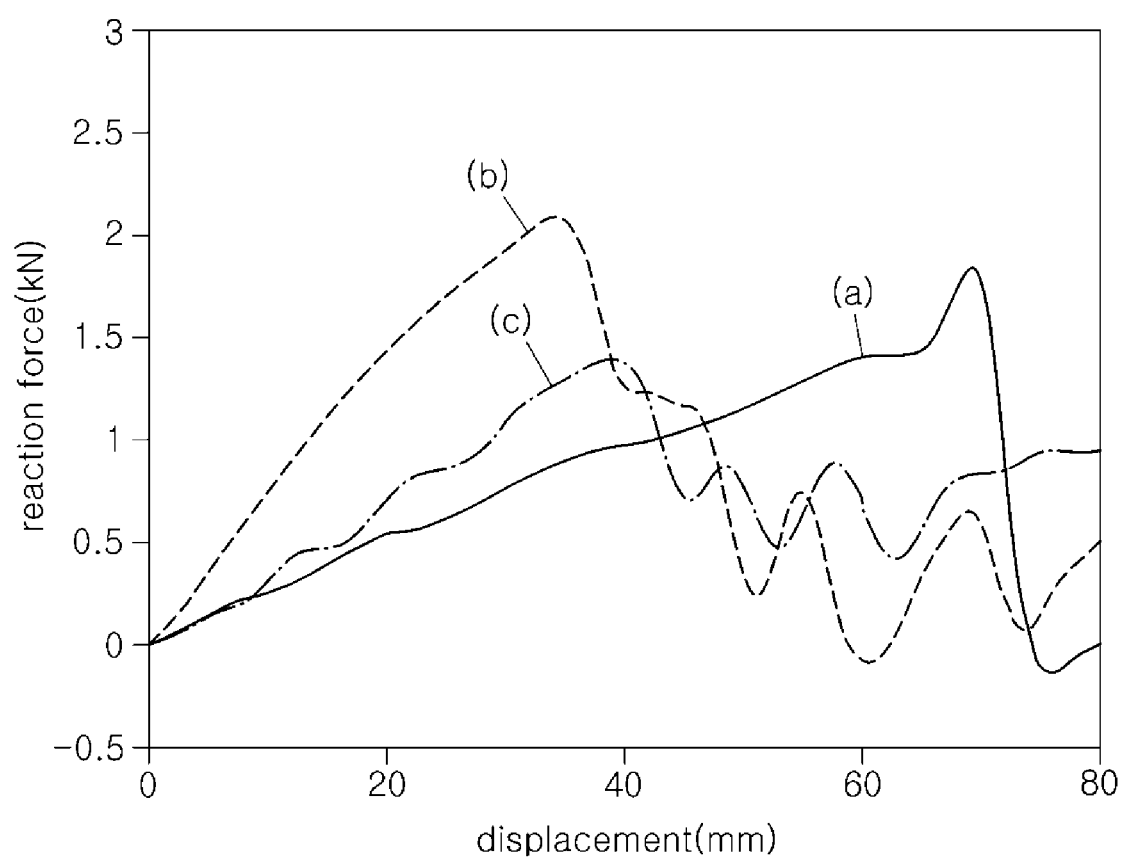
FIG. 5 is a graph showing results of a bending load test of the lower stiffener according to the comparative examples and the example.

FIGS. 4a to 4c are views showing a lower stiffener according to comparative examples and an example, and FIG. 5 is a graph showing results of a bending load test of the lower stiffener according to the comparative examples and the example.

FIG. 4a is a comparative example 1 in which core portions 1 using an 8 mm continuous fiber are arranged to be distanced from each other in the front and rear direction of the stiffener, which is perpendicular to the load direction, and a molding portion 2 is molded over the core portions 2.

FIG. 4b shows an example according to the present invention in which core portions 10 using an 8 mm continuous fiber are arranged to be distanced from each other in the front and rear direction of the stiffener, which is perpendicular to the load direction, and molding portions 20 and a connection portion 30 are formed to have a dumbbell shape in cross section.

FIG. 4c is a comparative example 2 in which a core portion 3 using a continuous fiber is applied to the entire stiffener and a molding portion 4 is formed to surround the core portion 3.

Herein, the total weight of the comparative example 1, the example, and the comparative example 2 were all adjusted to 450 g.

The bending load test was carried out for the comparative example 1, the example, and the comparative example 2 that were prepared as described above, and the results are shown in FIG. 5.

As can be seen from FIG. 5, it was confirmed that the example having a dumbbell shape in cross section exhibits excellent stiffness and strength against bending load on the basis of the same weight, as compared with the comparative example 1 and the comparative example 2.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A lower stiffener for a bumper of a vehicle, the lower stiffener to be mounted on a lower portion of a bumper beam or a front end module (FEM) carrier of the vehicle, the lower stiffener comprising:
    a first core portion;
    a second core portion, wherein the first and second core portions extend in a width direction of the vehicle in an elongated loop shape corresponding to a shape of the bumper of the vehicle, the first and second core portions being arranged parallel to each other at a regular interval;
    a first molding portion surrounding the first core portion;
    a second molding portion surrounding the second core portion; and
    a connection portion connecting and integrating the first and second molding portions to each other.

2. The lower stiffener of claim 1, wherein the first and second core portions each have a circular shape in cross section, the circular shape having a diameter of 5 to 10 mm.

3. The lower stiffener of claim 2, wherein the first and second core portions are configured to satisfy Equation 1 below:

$$3.3 \leq (\text{center distance between core portions})/(\text{diameter of core portions}) \leq 8.$$

4. The lower stiffener of claim 3, wherein a value of (center distance between core portions)/(diameter of core portions) described in the Equation 1 is 4 to 5.

5. The lower stiffener of claim 1, wherein a thickness each of the first and second molding portions is 1.5 to 4.0 mm and a thickness of the connection portion is 2 to 5 mm.

6. The lower stiffener of claim 1, wherein a volume each of the first and second core portions is 25 to 60 vol % with respect to a sum of volumes of the first and second core portions and the first and second molding portions.

7. The lower stiffener of claim 1, wherein with respect to the width direction of the vehicle, the lower stiffener is divided into:
    a first section defined at a center portion of the lower stiffener;
    a pair of second sections defined from opposite ends of the first section to mounting portions to be connected to the bumper beam or the FEM carrier; and
    a pair of third sections defined from ends of the second sections to ends of the lower stiffener, wherein molding portions in the first section are configured such that thickness in a front and rear direction of the vehicle is greater than thickness in a height direction of the vehicle.

8. The lower stiffener of claim 7, wherein the molding portions in the first section are configured such that cross-sectional area gradually increases toward a center with respect to the width direction of the vehicle.

9. The lower stiffener of claim 8, wherein the molding portions in the first section are configured such that a thickness in the front and rear direction gradually increases toward the center with respect to the width direction of the vehicle.

10. The lower stiffener of claim 7, wherein the connection portion is configured such that a thickness in the height direction in the first section is greater than a thickness in the height direction in the second and third sections.

11. The lower stiffener of claim 7, wherein the connection portion in the first section is provided with a center rib formed in the front and rear directions,
the connection portion at boundaries of the first and second sections is provided with a pair of vertical ribs,
the connection portion in the first and second sections is provided with X-shaped cross ribs formed at centers of the center rib and the pair of vertical ribs, and
the connection portion in the second sections is provided with horizontal ribs formed by extending from ends of the cross ribs to the mounting portions in the width direction.

12. The lower stiffener of claim 1, wherein the core portions consist of 40 to 60 wt % of a continuous fiber and 40 to 60 wt % of a thermoplastic resin.

13. The lower stiffener of claim 1, wherein the molding portions consist of 20 to 40 wt % of a non-continuous fiber and 60 to 80 wt % of a thermoplastic resin.

14. The lower stiffener of claim 1, wherein the first and second core portions, the first and second molding portions, and the connection portion are made of fiber-reinforced plastic.

15. A vehicle comprising:
a vehicle body;
an apparatus connected to the vehicle body, the apparatus comprising a bumper beam or a front end module (FEM) carrier; and
a lower stiffener mounted on the apparatus, the lower stiffener comprising:
a first core portion;
a second core portion, wherein the first and second core portions extend in a width direction of the vehicle in an elongated loop shape corresponding to a shape of the bumper of the vehicle, the first and second core portions being arranged parallel to each other at a regular interval;
a first molding portion surrounding the first core portion;
a second molding portion surrounding the second core portion; and
a connection portion connecting and integrating the first and second molding portions to each other.

16. The vehicle of claim 15, wherein the first and second core portions each have a circular shape in cross section, the circular shape having a diameter of 5 to 10 mm.

17. The vehicle of claim 15, wherein the first and second core portions are configured to satisfy Equation 1 below:

3.3≤(center distance between core portions)/(diameter of core portions)≤8; and wherein a value of (center distance between core portions)/(diameter of core portions) described in the Equation 1 is 4 to 5.

18. The vehicle of claim 15, wherein a volume each of the first and second core portions is 25 to 60 vol % with respect to a sum of volumes of the first and second core portions and the first and second molding portions.

19. The vehicle of claim 15, wherein with respect to the width direction of the vehicle, the lower stiffener is divided into:
a first section defined at a center portion of the lower stiffener;
a pair of second sections defined from opposite ends of the first section to mounting portions connected to the bumper beam or the FEM carrier; and
a pair of third sections defined from ends of the second sections to ends of the lower stiffener,
wherein molding portions in the first section are configured such that thickness in a front and rear direction of the vehicle is greater than thickness in a height direction of the vehicle.

* * * * *